United States Patent [19]

Saito

[11] Patent Number: 4,561,167

[45] Date of Patent: Dec. 31, 1985

[54] FILM MOUNTING DEVICE

[75] Inventor: Kaneo Saito, Hino, Japan

[73] Assignee: Konishiroku Photo Industry Co., Ltd., Tokyo, Japan

[21] Appl. No.: 551,064

[22] Filed: Nov. 14, 1983

[30] Foreign Application Priority Data

Nov. 18, 1982 [JP] Japan ................................ 57-202738

[51] Int. Cl.[4] ................................................ B23Q 7/00

[52] U.S. Cl. ...................................... 29/564.6; 29/806; 53/520

[58] Field of Search .................. 29/33 R, 33 K, 564.1, 29/564.2, 564.6, 564.8, 806, 740, 783, 809; 53/520, 435

[56] References Cited

U.S. PATENT DOCUMENTS 3,499,202 3/1970 Napor ................................ 29/564.6

3,822,460 7/1974 Rinehow ............................ 29/564.6

4,205,436 6/1980 Klotz et al. ........................... 29/783

4,227,289 10/1980 Avalon et al. ....................... 29/33 K 4,237,678 12/1980 Thompson ......................... 29/564.6

*Primary Examiner*—William R. Briggs

*Attorney, Agent, or Firm*—James E. Nilles; Thomas F. Kirby

[57] ABSTRACT

A film mounting device wherein a mounting frame constituted by a pair of foldable main and auxiliary plates is transferred from a stocking position to a mounting position by a cam means, a developed film is fed so as to be set in place one frame at a time in the mounting frame by a detecting means, one frame thus of the film fed out is cut, the film is fitted into the main plate of the mounting frame and the auxiliary plate of the mounting frame is folded on the main plate by means of a folding rod which is driven by a cam, and finally the auxiliary plate is pressed on the main plate intimately by using rollers.

2 Claims, 10 Drawing Figures

FILM MOUNTING DEVICE

BACKGROUND OF THE INVENTION

1. Field of the Invention

This invention relates to a film mounting device wherein a long rolled developed film is mounted on a mounting frame one frame at a time.

2. Description of the Prior Art

In general, in editing a long rolled developed film such as a reversal film, it is necessary to mount the film on a mounting frame one frame at a time, in order to improve the efficiency of slide projection, the cutting efficiency of the film for editing, and the maintenance and inspection thereof.

SUMMARY OF THE INVENTION

This invention has been suggested in view of the above-mentioned requirements inherent in film editing.

A primary object of the invention is to provide a film mounting device which can accomplish a series of operations in succession with high working efficiency, which comprises the steps of cutting a long rolled developed film one frame at a time and mounting it on a mounting frame.

The film mounting device according to this invention is characterized by comprising a stocking means for stocking a plurality of mounting frames, each of which is constituted by a pair of foldable main and auxiliary plates at a predetermined position, a mounting frame setting means for transferring the mounting frame from a stocking position to a mounting position by a cam means, a film feeding means for feeding a developed film so it is set in place one frame at a time in a mounting frame by a detecting means, a film cutting means for cutting one frame of the film fed out by the film feeding means, and a mounting frame folding means for fitting the film into the main plate of the mounting frame and folding the auxiliary plate of the mounting frame on the main plate by means of a folding rod which is driven by a cam means, and finally pressing the auxiliary plate to the main plate intimately by using rollers.

Other objects and advantages of this invention will be apparent in conjunction with the following description of an embodiment with reference to the accompanying drawings.

BRIEF DESCRIPTION OF THE DRAWINGS

The drawings show the film mounting device according to one embodiment of this invention, in which

FIG. 1 is a perspective view of the mounting frame opened for mounting a film therein;

FIG. 2 is a cross section taken along line II—II in FIG. 1;

FIG. 3 is a perspective view of the mounting frame, in which film is already mounted and bi-folded, and FIG. 4 is a cross section taken along line IV—IV in FIG. 3;

DESCRIPTION OF THE PREFERRED EMBODIMENTS

Figure 1:
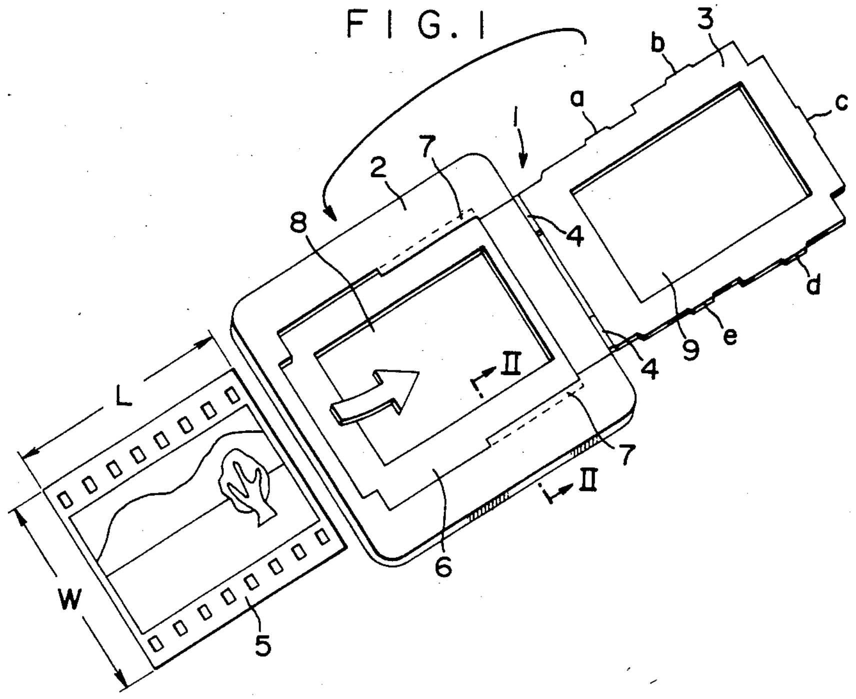
FIGS. 1 through 4 show the mounting frame employed in this invention.
Figure 2:
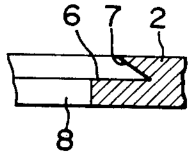

Referring to FIG. 1, a mounting frame 1 employed in this invention comprises a rectangular main plate 2 and a rectangular auxiliary plate 3, both molded of a flexible material such as plastic in an integral unit so as to be interconnected at a hinge part 4. In the main plate 2, a recess part 6 is formed which has a rectangular bottom surface substantially of the same size as a single-cut piece of developed film (this will be referred to only as "film" hereinafter) of a length L and a width W. At a part of both sides of the recess part 6, a dovetail 7 is formed as shown in FIG. 2. In the center of the recess part 6, a rectangular hole 8 is provided substantially of the same size of the effective image zone of the film 5.

Similarly, in the central part of the auxiliary plate 3, a rectangular hole 9 substantially of the same shape as the rectangular hole 8 in the main plate 2 is formed at a corresponding position to the hole 8. In the outer periphery of the plate 3, small projections (a) to (e) are formed.

Figure 4:
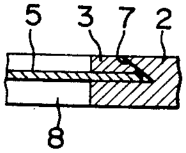
Figure 3:
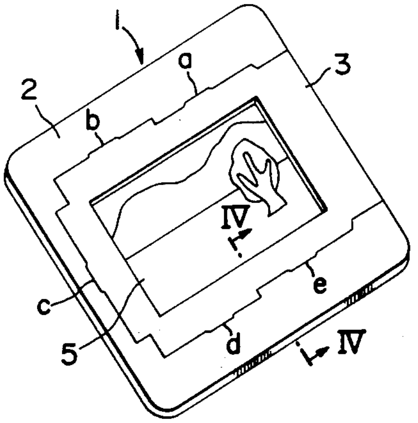

In mounting the film on the thus-constructed mounting frame, the film 5 is inserted at the edge into the dovetail 7 formed in the main plate as shown in FIG. 4. If the effective image zone of the film 5 coincides with the rectangular hole 8 of the main plate 2, the auxiliary plate 3 is turned around the hinge part 4 over the main plate 2 as indicated by an arrow A in FIG. 1. In this instance, the small projections (a) to (e) are engaged with the inner side of the main plate 2. Thus the film 5 is intimately gripped between the main and auxiliary plates 2 and 3, thereby completing the film mounting on the mounting frame 1.

Next, a device for performing this film mounting on the mounting frame as mentioned above will be described as depicted in FIGS. 5 through 8 of the accompanying drawings.

Regarding a film feeding mechanism, a lamp 11 for illuminating the film 5 is housed inside a film feeding stand 10 (this lamp may be omitted). The film feeding stand 10 is provided with an opening on the upper surface, into which a sheet glass 12 comprising frosted glass or opal glass is fitted.

On the film feeding stand 10, a cartridge container 13 in which the film 5 is rolled is supported by a support means 14. The film 5 housed in this container 13 is fed onto the upper surface of the glass 12 part. In this instance, the film 5 may be placed on a reel, or even exposed instead of covered by the container 13 or the like.

The film 5 has perforations which engage with sprockets 16 provided on a shaft 15.

The shaft 15 is equipped at one end with a manual feeding knob 17 through a one-way clutch not shown, and at the other end secured fixedly with a gear 18 and a cam 19 integrally.

The peripheral edge of the cam 19 is in contact with an actuator 21 of a microswitch 20 in such a manner that when a recess 22 formed on the peripheral edge of the cam 19 comes into an engagement with the actuator 21, the depressed microswitch 20 is released, and furthermore, the film 5 is fed by one frame by a rotation of the shaft 15.

A gear 18 is connected to a motor 25 for feeding film 5 through a pair of reduction gears 23 and 24.

A detection of feeding length of one frame of the film 5 may be performed by the rotation of the shaft 15, as mentioned above, or also by provision of a photo detecting element T at an appropriate position, which detects the image frame end of the film 5 and operates the microswitch 20 on the basis of such detection.

The film feeding may be performed by a friction wheel instead of by the sprocket 16 as explained above.

The explanation will now proceed to the structure of the film cutting mechanism. On the film advancing side of the film feeding stand 10, a lower stationary blade 26 is mounted. Opposite thereto, an upper rotary blade 27 engageable with the lower blade 26 is provided and is rotatable around a pivot 28. The upper blade 27 has a pin 29 fixed on one end.

Figure 5:
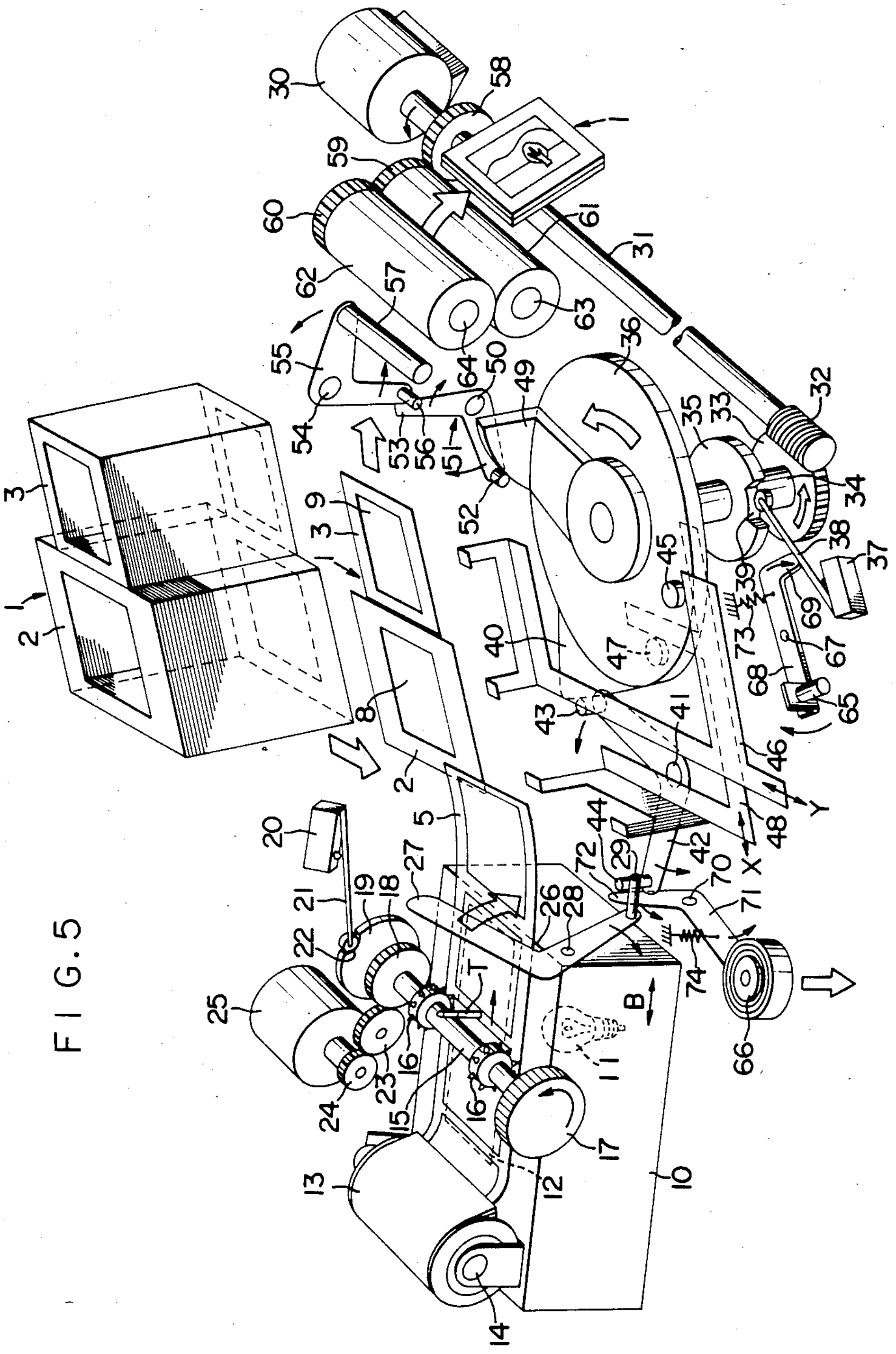
FIG. 5 is a perspective view schematically depicting the entire structure of the film mounting device according to the present invention.

The film feeding stand 10 is designed to be movable in the horizontal direction, as indicated by an arrow B in FIG. 5, so that the film mounting position can be finely adjusted.

Figure 8:
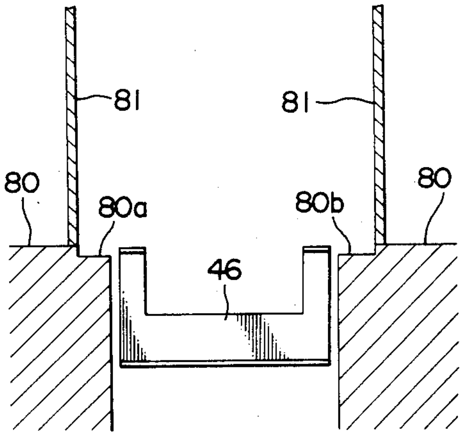
FIG. 8 is a cross section view of the stocking means.

As shown in FIG. 8, a stocking means comprises mounting frame feeding stands 80 having step portions 80*a*, 80*b*, respectively, and side plates 81 for regulating in position the stacked mounting plates. Such stocking means is omitted in FIG. 5.

As to the mounting frame setting means, at the tip end of an output shaft 31 of a mounting frame feeding motor 30, a worm 32 is fixed which is in engagement with a worm wheel 33. The worm wheel 33 has a shaft 34 fixed thereon, which is provided with a small diameter cam 35 and a large diameter cam 36.

The periphery of the small diameter cam 35 is in contact with an actuator 38 of a microswitch 37 in such a manner that, when the actuator 38 engages with a recess 39 formed in the periphery of the cam 35, the depressed microswitch 37 is released.

On the other hand, on the periphery of the large diameter cam 36, a projection 40 is formed, which is in engagement with a pin 43 provided at one end of a link 42 mounted on a support shaft 41.

At the other end of the link 42, another pin 44 is fixed and engaged with the aforementioned pin 29.

On the upper surface of the cam 36, a pin 45 is secured fixedly in engagement with a mounting frame transferring member 46, which transfers the mounting frame 1 stacked in place in direction Y.

The Y-direction transferring member 46 is biased toward the stocking means for the mounting frame 1 by means such as a spring member. The member 46, after transferring the mounting frame 1 in the direction Y up to the mounting position, returns to its starting position due to disengagement of the pin 45 by rotation of the cam 36.

Further, on the lower surface of the large diameter cam 36, a pin 47 is fixedly attached, which engages with an X-direction transferring member 48 for transferring the mounting frame 1 in direction X.

The X-direction transferring member 48 is biased toward the film feeding stand 10 by means such as a spring. The member 48, after feeding the mounting frame 1 in the direction X, returns to its starting position by disengagement of the pin 47 due to rotation of the cam 36.

It should be noted that it is also possible to mount automatically the mounting frame 1 in the vicinity of the sprocket 16 on the film feeding stand 10, and cut and insert the film 5 therein. In this instance, the mounting frame feeding mechanism can be omitted, and instead, a discharging mechanism is provided.

Next, the structure of the mounting frame pressing mechanism will be described.

Above the edge of the upper surface of the large diameter cam 36 a projection 49 is provided, being supported by the shaft 34, which projection is in contact on the peripheral surface with a pin 52 fixedly attached at one end of a link 51 mounted on a support shaft 50. This link 51 has a contact part 53 at the other end, which engages with a pin 56 planted fixedly at one end of a link 55 mounted on a support shaft 54. This link 55 has a folding rod 57 at the other end for folding the mounting frame 1.

On the other hand, a gear 58 is mounted on the output shaft 31 of the mounting frame feeding motor 30. This gear 58 engages with another gear 59, which engages with a further gear 60 in succession. The latter gears 59 and 60 have attaching rollers 61 and 62, respectively, made of a resilient material such as rubber and supported on shafts 63 and 64, respectively.

In folding the mounting frame 1, with the lever of the link 55 formed shorter than that of the link 51, when the link 51 turns by a predetermined amount in the clockwise direction by engagement with the projection 49 above the large diameter cam 36, the link 55 turns in the counterclockwise direction by an amount larger, due to the rotation ratio between the levers of the links 51 and 55, than the rotation angle of the link 51, and therefore, the folding rod 57 folds the auxiliary plate 3 of the mounting frame 1 onto the main plate 2 thereof. The mounting frame 1 thus folded is then gripped between the attaching rollers 61 and 62, rendering the attachment of these plates 2 and 3 more intimate.

Figure 6A:
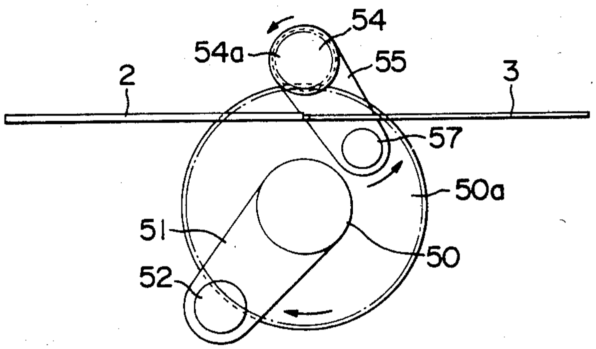
FIGS. 6(*a*), 6(*b*) and 6(*c*) are explanatory schematic views of a mounting frame folding means according to another embodiment of this invention.
Figure 6B:
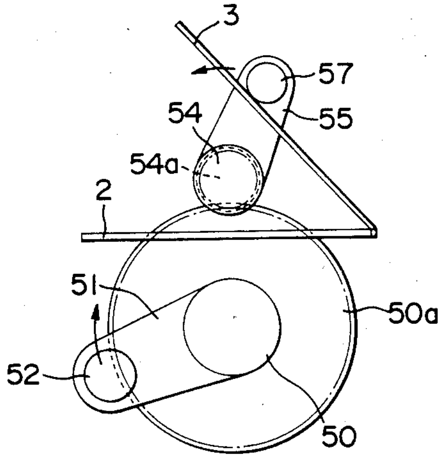
Figure 6C:
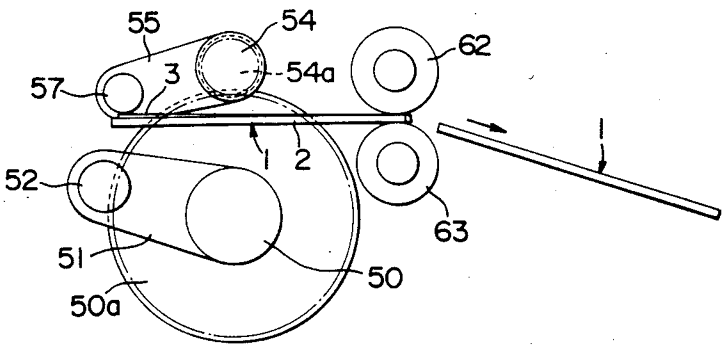

FIGS. 6(*a*), 6(*b*) and 6(*c*) show another embodiment of the bi-folding system of the mounting frame 1. In this particular embodiment, a gear 50*a* is provided on the support shaft 50 of the link 51, whereas a gear 54*a* is provided on the support shaft 54 of the link 55. These gears 50*a* and 54*a* engage at a certain gear ratio, for example 1:4, thereby obtaining a certain rotation angle.

At the starting position, as illustrated in FIG. 6(*a*), the pin 52 of the link 51 is apart from the mounting frame 1, while the auxiliary plate 3 of the mounting frame 1 is positioned upward of the folding rod 57 of the link 55. When the link 51 rotates in the clockwise direction by contact with the projection 49 of the large diameter cam 36, the link 55 rotates greatly, causing the folding rod 57 to fold the auxiliary plate 3 on the main plate 2 of the mounting frame 1. At the same time as this, the mounting frame 1 is transferred rightward by the X-direction transferring member 48 into a state shown in FIG. 6(*b*).

When the link 51 rotates further in the clockwise direction, the bi-folding of the mounting frame 1 is substantially finished. Upon the insertion of the small projections (a) to (e) of the auxiliary plate 3 into the dovetails 7, the mounting frame 1 is gripped between the attaching rollers 61 and 62 as bi-folded.

Returning to the description of the entire structure of the device for mounting the film on the mounting frame, a button 65 for selectively and manually depressing the microswitch 37 and another button 66 for selectively and manually depressing the upper blade 27 are provided.

In more detail, the button 65 is fixed at one end of a link 68 mounted on a support shaft 67. The link 68 has a contact part 69 at the other end for depressing the actuator 38 of the microswitch 37. The button 66 is fixed at one end of a link 71 mounted on a support shaft 70. The link 71 has a contact part 72 at the other end for depressing the pin 29 integral with the upper blade 27.

In its unpushed state, the button 65 is drawn by a spring 73 biased in the direction in which it does not depress the actuator 38. Similarly, the button 66, in its unpushed state, is drawn by a spring 74 biased in the direction in which it does not depress the pin 29 by the contact part 72.

Figure 7:
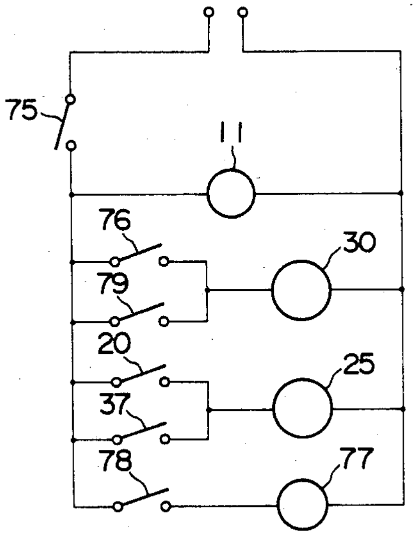
FIG. 7 is a schematic diagram of a basic electric circuit employed in the film mounting device of this invention.

Next, the operation of the film mounting device having the above-mentioned construction will be described in detail with reference to a basic electric circuit diagram shown in FIG. 7.

This device employs basically a dry-cell powered driving system, but it is also possible to use a domestic electric source of 100 V, if converted properly by an adapter.

First, an electric source switch 75 is closed to light the lamp 11 for illuminating the film 5. Then the film 5 is drawn out of the cartridge 13 and set so as to position a first frame at a predetermined position. The button 66 is pushed to make the upper blade 27 cut the extra tip end of the film 5, where no image is contained. After that, a starting switch 76 of the mounting frame feeding motor 30 is closed to rotate the output shaft 31. The rotation of the output shaft 31 is transmitted in succession to the worm 32, worm wheel 33, shaft 34, small diameter cam 35 and large diameter cam 36.

By the rotation of the large diameter cam 36, the Y-direction transferring member 46 moves in direction Y by means of the pin 45, so as to transfer the mounting frame 1 from the stocking position to the mounting position.

By the rotation of the small diameter cam 35, the actuator 38 of the microswitch 37 is pushed, thereby turning ON the microswitch 37 so as to rotate the film feeding motor 25. This rotation is transmitted through the gears 24 and 23 to the gear 18, causing the cam 19 and sprocket 16 to rotate.

Accompanying the rotation of the cam 19, the actuator 21 of the microswitch 20 is pushed to turn ON the microswitch 20.

At the same time of this, the sprocket 16 feeds the film 5 by one frame. The film 5 is then inserted at the tip end into the dovetail 7 formed in the main plate 2 of the mounting frame 1 which is already set from the stocking position to the mounting position.

When one frame of film is fed, the actuator 21 comes into engagement with the recess 22 of the cam 19 and out of the depression, so that the microswitch 20 turns OFF. On the other hand, the microswitch 37 is also released out of the depression by the occupation of the recess 39 of the small diameter cam 35 by the actuator 38, so that the film feeding motor 25 stops.

During this time interval, the large diameter cam 36 continues to rotate by means of the mounting frame feeding motor 30. Accordingly, the link 42 is rotated by the projection 40 in the counterclockwise direction, thereby rotating the upper blade 27 in the clockwise direction to cut off one frame of the film 5.

The one frame of film 5 is housed in the mounting frame 1 with the tip end fitted firmly into the dovetail 7, and thus film mounted frame 1 is transferred in direction X by the X-direction transferring member 48 by the large diameter cam 36 through the pin 47. When the auxiliary plate 3 of the mounting frame 1 comes to the folding position above the folding rod 57, the link 55 is rotated in the counterclockwise direction by the link 51 which rotates in the clockwise direction due to the pushing by the projection of the large diameter cam 36. Thus the folding rod 57 turns also in the counterclockwise direction to fold the auxiliary plate 3 onto the main plate 2. Then the bi-folded mounting frame 1 is led to the attaching rollers 61 and 62.

The attaching rollers 61 and 62 grip the mounting frame 1, thus bi-folded and transferred, therebetween to confirm the attachment of the main and auxiliary plates 2 and 3. The resultant mounting frame 1, mounted with the film 5, bi-folded and attached firmly, is discharged from the mounting device, completing the film mounting operation on the mounting frame.

It may be very useful to provide a film number counter 77 at an appropriate position in the device, which is operated by a counter switch 78 for counting the number of finished products.

To counter such an inconvenience that a frame having a poor-quality scene is found in the film 5 during the mounting operation, an expulsion thereof will be performed as follows:

That is, when a frame having a poor-quality scene is found in a film 5 being subjected to the film mounting operation by means of the illumination of the lamp 11, a stop switch 79 for the mounting frame feeding motor 30 is operated to stop the motor 30, but only after mounting of a preceeding film of good quality. After that, the microswitch 37 is turned ON by pushing the button 65 to start the film feeding motor 25.

By this means, the film feeding motor 25 stops only after feeding the poor-quality frame of the film 5 by operation of the microswitch 20 or photo detecting element T.

Then the film 5 is cut at the end of the poor-quality frame by manual operation of the button 66. If the subsequent frame of the film 5 is of good quality, the automatic operation of the device is restarted by the starting switch 76 of the mounting frame feeding motor 30.

The film mounting device having the above-described construction has many advantages as follows:

The automatic mounting of the developed film on the mounting frame one frame at a time improves the working efficiency of the film mounting and simplifies the mounting process. This automatic work omits any manual operation, therefore, the image on the film is protected from soiling by contact with an unclean hand.

The mounting work is carried out in succession by mechanical means, therefore, uniform film mounting can be achieved.

The device can be so small in size that it is portable.

Further, either a battery cell or domestic electric source can be selectively employed as an electric power source, though in the use of the domestic electric source, an adapter should be used.

Thus, the present invention provides a film mounting device which plays a prominent role in a film mounting operation without soiling the photographic image borne by the film and with high working efficiency, and is sufficiently small so as to be portable and adapted to be used anywhere if needed.

What is claimed is:

1. A film mounting device comprising:

a stocking means for stocking a mounting frame at a predetermined stocking position, said mounting frame being constituted by a pair of foldable main and auxiliary plates, a mounting frame setting means, including first cam means, for transferring said mounting frame from said stocking position to a mounting position by said first cam means, a film feeding means, including a detecting means, for feeding a developed film to be set in place one frame at a time in said mounting frame by said detecting means, a film cutting means for cutting one frame of the film fed out by said film feeding means, a mounting frame folding means, including a folding rod and second cam means, for fitting said film into the main plate of said mounting frame and folding the auxiliary plate of said mounting frame on said main plate by means of said folding rod which is driven by said second cam means, and rollers for finally pressing said auxiliary plate to said main plate intimately.

2. A film mounting device according to claim 1, wherein said mounting frame setting means comprises a transferring member which is driven by said first cam means intermittently for transferring a mounting frame from a stocking position.

* * * * *